United States Patent
Durham et al.

(10) Patent No.: US 9,619,145 B2
(45) Date of Patent: Apr. 11, 2017

(54) METHOD RELATING TO CONFIGURABLE STORAGE DEVICE AND ADAPTIVE STORAGE DEVICE ARRAY

(71) Applicant: LENOVO ENTERPRISE SOLUTIONS (SINGAPORE) PTE. LTD., New Tech Park (SG)

(72) Inventors: Pamela C. Durham, Apex, NC (US); Henry Pesulima, Raleigh, NC (US); Eric A. Stegner, Durham, NC (US); Julian Sia Kai Tan, Singapore (SG); Eric W. Townsend, Raleigh, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 586 days.

(21) Appl. No.: 14/041,670

(22) Filed: Sep. 30, 2013

(65) Prior Publication Data

US 2014/0365818 A1    Dec. 11, 2014

Related U.S. Application Data

(63) Continuation of application No. 13/911,248, filed on Jun. 6, 2013, now Pat. No. 9,213,610.

(51) Int. Cl.
| | |
|---|---|
| *G06F 12/00* | (2006.01) |
| *G06F 3/06* | (2006.01) |
| *G06F 11/20* | (2006.01) |
| *G06F 11/10* | (2006.01) |

(52) U.S. Cl.
CPC .......... *G06F 3/0604* (2013.01); *G06F 3/0607* (2013.01); *G06F 3/0614* (2013.01); *G06F 3/0629* (2013.01); *G06F 3/0632* (2013.01); *G06F 3/0683* (2013.01); *G06F 3/0689* (2013.01); *G06F 11/2069* (2013.01); *G06F 11/2094* (2013.01); *G06F 11/1092* (2013.01)

(58) Field of Classification Search
None
See application file for complete search history.

(56) References Cited

U.S. PATENT DOCUMENTS

| | | |
|---|---|---|
| 6,192,448 B1 | 2/2001 | Mansur |
| 8,327,066 B2 | 12/2012 | Heo et al. |
| 2001/0004753 A1* | 6/2001 | Dell .................... G06F 12/0646 711/5 |

(Continued)

OTHER PUBLICATIONS

"SSD/HDD: Dynamic modification of RAID arrays to ensure globally optimized performance," IP.com No. IPCOM000196381D, Jun. 2, 2010.

*Primary Examiner* — Midys Rojas
*Assistant Examiner* — Stephanie Wu
(74) *Attorney, Agent, or Firm* — Jason Friday

(57) ABSTRACT

An array can include a controller and multiple storage devices of a first type. When a storage device of the first type is replaced by a replacement storage device of a second type, and other storage devices of the first type remain in the array, the controller instructs the replacement storage device to configure itself as a storage device of the first type. When the last storage device of the first type in the array is replaced by a replacement storage device of the second type, the controller instructs all the storage devices of the array to configure themselves as storage devices of the second type.

6 Claims, 3 Drawing Sheets

(56) References Cited

U.S. PATENT DOCUMENTS

| | | |
|---|---|---|
| 2003/0115387 A1 | 6/2003 | Stover et al. |
| 2008/0172571 A1 | 7/2008 | Andrews et al. |
| 2010/0146233 A1* | 6/2010 | Chrisman ........... G06F 13/1668 711/163 |
| 2010/0250831 A1 | 9/2010 | O'Brien et al. |
| 2011/0035540 A1 | 2/2011 | Fitzgerald et al. |
| 2011/0246706 A1 | 10/2011 | Gomyo et al. |
| 2012/0233433 A1 | 9/2012 | Grunzke |
| 2012/0260037 A1 | 10/2012 | Jibbe et al. |
| 2012/0303940 A1 | 11/2012 | Grice et al. |
| 2012/0317338 A1 | 12/2012 | Yi et al. |
| 2013/0274912 A1 | 10/2013 | Reasoner |
| 2016/0034199 A1 | 2/2016 | Durham et al. |

* cited by examiner

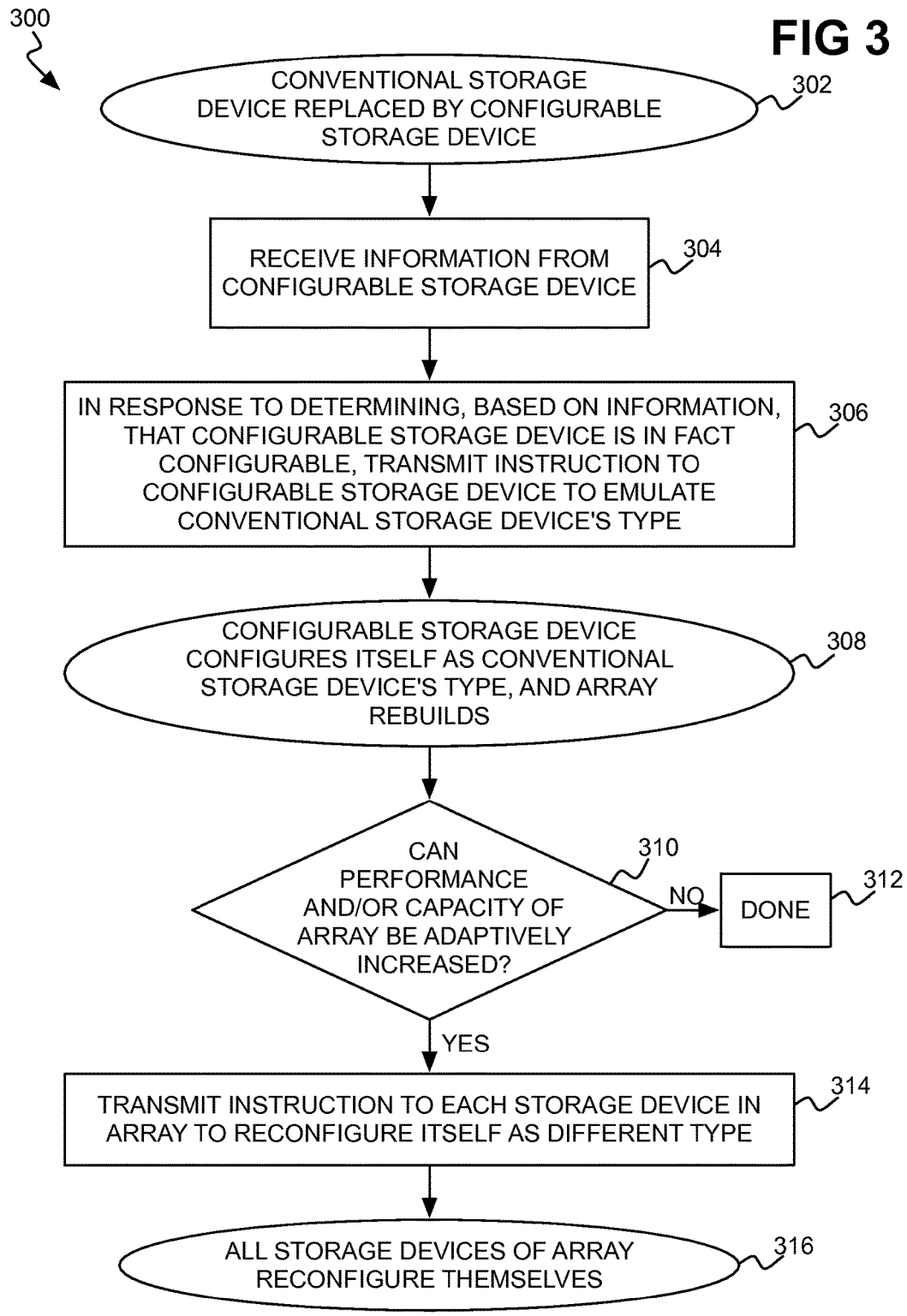

METHOD RELATING TO CONFIGURABLE STORAGE DEVICE AND ADAPTIVE STORAGE DEVICE ARRAY

RELATED APPLICATIONS

The present patent application is a continuation of the patent application filed on Jun. 6, 2013, and assigned application Ser. No. 13/911,248.

BACKGROUND

Storage devices include hard disk drives (HDDs), solid-state drives (SSDs), as well as other types of storage devices. A number of storage devices can be arranged within an array to permit greater capacity, greater performance, and/or more redundancy than any individual storage device within the array provides. Examples of storage device arrays include redundant array of independent disks (RAID)-0, which stripes data across multiple storage devices for increased capacity and performance; RAID-1, which mirrors data between two storage devices for increased redundancy; and RAID-5, which provides for increased capacity, performance, and redundancy.

SUMMARY

An example method includes, in response to replacement of an existing storage device of a first type within an array of storage devices with a replacement storage device of a second type, performing the following. Metadata is received by a controller of the array from the replacement storage device. The metadata regards capabilities of the replacement storage device. In response to the controller determining based on the metadata that the replacement storage device is configurable, the controller sends to the replacement storage device an instruction to configure itself as a storage device of the first type. Responsive to receiving the instruction from the controller, the replacement storage device configures itself as the storage device of the first type.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 3 is a flowchart of an example method for a controller of a storage device array to cause a configurable storage device to suitably configure itself upon connection thereto and to adaptively increase performance and/or capacity of the array if possible.

DETAILED DESCRIPTION

Figure 1:
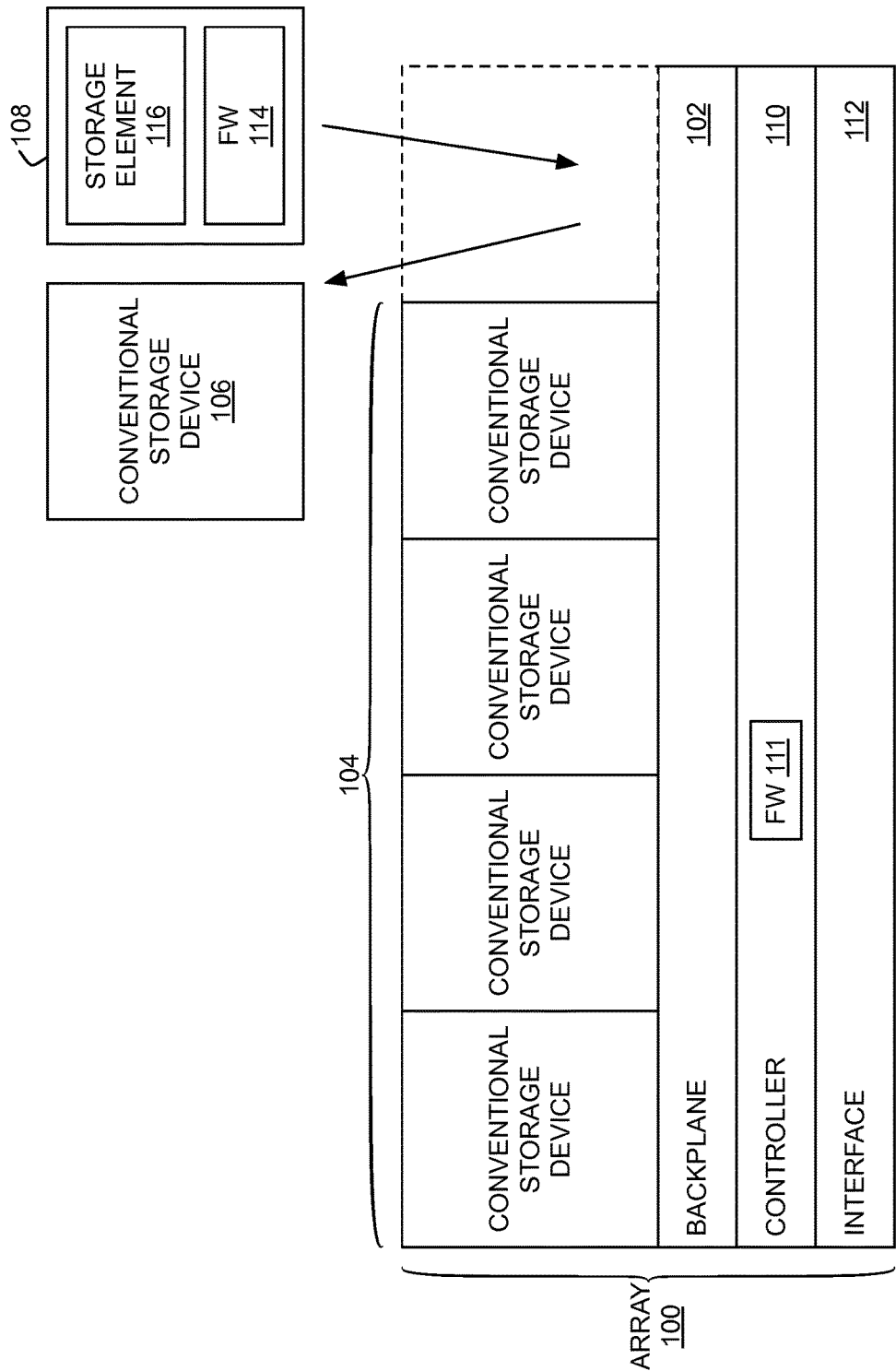
FIG. 1 is a diagram of an example storage device array in which a conventional storage device is being replaced by a configurable storage device of a different type.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, storage devices can be configured into arrays of various types to provide for benefits including redundancy. For example, in a redundant array of independent disks (RAID)-1 or RAID-5, if a storage device of the array should fail, a replacement storage device can be substituted in its place without loss of data. The array rebuilds itself so that the array again provides redundancy.

A disadvantage to many types of arrays is that the storage devices have to be of the same type, and may have to be replaced by the same type when they fail. The type of a storage device can include its performance as well as its capacity, or even the exact model from a particular manufacturer. Larger organizations can have a large number of arrays of various kinds, with many different types of storage devices.

Such an organization has a number of options, none particularly desirable, to plan for the inevitability of storage device failure. The organization may maintain limited or no backup stock of the type of storage device in question, and instead order the device from the manufacturer. However, the manufacturer may no longer make and may no longer have available the particular storage device type required, potentially resulting in the array no longer be able to be rebuilt to its previous, redundancy-providing state.

The organization may maintain a relatively large supply of backup stock of each type of storage device in its arrays. However, this is disadvantageous as well, requiring upfront capital expenditure and physical storage space requirements for the backup devices. Furthermore, there is no guarantee that the organization will maintain a large enough backup supply, forcing it instead to hope that the manufacturer still makes or has available the particular storage device type required.

If the manufacturer no longer makes and has available the particular storage device type that an organization needs, the organization can only hope that the storage device is still available on the open market. The organization may have to commit resources to locating the storage device, with no guarantee of success. If the organization fails to locate the required storage device, the array with the failed device no longer has redundancy, and another failure within the array can result in data loss.

Disclosed herein are techniques that address these issues. A storage device is configurable, and can effectively mimic a different storage device type. Therefore, rather than having to stock a number of different types of replacement storage devices—or even any at all—an organization just has to stock one type of storage device type, regardless of the storage devices currently installed in its arrays. The techniques further permit the array to adaptively provide better performance, such as throughput, when the conventional storage device that is replaced within the array by a configurable storage device had the lowest performance of any storage device within the array. For example, if one or more conventional storage devices remain in the array, the array can have its performance improved to match that of the conventional storage device now having the lowest performance of any storage device within the array. As another example, if no more conventional storage devices remain in the array, the array can have its performance improved to match the intrinsic performance of the configurable storage devices.

FIG. 1 shows an example storage device array 100. The array 100 may be a RAID-type array, or a different type of array. The array 100 includes a backplane 102 into which a number of conventional storage devices 104 are connected. The conventional storage devices 104 are said to be of a first type, and may be hard disk drives, for instance, of a particular capacity and having a particular performance, such as throughput. Another conventional storage device 106 of this same first type is in FIG. 1 in the process of being replaced within the array 100.

Conventionally, the conventional storage device 106 would have to be replaced within the array 100 by a replacement storage device of the same first type. By comparison, in FIG. 1, the conventional storage device 106 is being replaced by a configurable storage device 108. The configurable storage device 108 is of a second type of a capacity greater than that of the first type and/or a performance (e.g., throughput) greater than that of the first type. The configurable storage device 108 includes firmware 114 and a storage element 116, the latter which may itself be a conventional storage device, such that the firmware 114 provides for the configurability of the device 108 as a whole.

The array 100 also includes a controller 110 communicatively connected to the backplane 102, and an interface 112 communicatively connected to the controller 110. The controller 110 is typically implemented in hardware, such as a semiconductor integrated circuit (IC), like an application-specific IC (ASIC), a field-programmable gate array (FPGA), and so on. The controller 110 includes firmware 111 that may provide for the usage of the configurable storage device 108 within the array 100 as described below; that is functionality ascribed below to the controller 110 can be performed by the firmware 111 of the controller 110. The array 100 is itself connected to a host computing device or system via the interface 112, which may be a wireless or a wired interface, including the universal serial bus (USB) interface, a serial AT attachment (SATA) interface, a network interface, and so on.

In operation, when the configurable storage device 108 is connected to the backplane 102, the firmware 114 transmits information, such as metadata, regarding its capabilities to the controller 110. Besides the intrinsic performance and capacity of the storage device 108, the firmware 114 transmits the fact that it is configurable to lesser performance and lesser capacity. The controller 110 receives this information.

The controller 110 determines (i.e., knows from prior communication) that the other storage devices 104 within the array 100 have lesser performance and capacity than the configurable storage device 108 does, because the storage devices 104 are of the first type and the storage device 108 is of the second type. Therefore, the controller 110 transmits an instruction to the firmware 114 of the storage device 108 for the device 108 to be configured as the first type. The firmware 114 receives this instruction, configures the storage device 108 appropriately, and the array 100 can then begin the rebuilding process due to the storage device 106 being replaced by the storage device 108.

Therefore, although the configurable storage device 108 is of a different type than the conventional storage devices 104 that are already part of the array 100, the storage device 108 acts within the array 100 as if it were a storage device of this same (first) type, even though the storage device 108 is a different (second) type. The firmware 114 can permit the storage device 108 to have such configurability, particularly when the storage element 116 is itself a conventional (non-configurable) storage device. Although the storage device 108 intrinsically remains a greater capacity and higher performance (second) type of storage device, within the array 100 in the example of FIG. 1, the device 108 configures itself with lower performance (and possibly lower capacity as well) as a storage device of the (first) type.

Each conventional storage device 104 remaining within the array 100 can be replaced in individual succession by a configurable storage device 108 following this same process. For most types of redundant arrays, just one conventional storage device 104 may be replaced at a given time to avoid data loss. Once a configurable storage device 108 has replaced the conventional storage device 104 in question, and the array 100 rebuilt, the next conventional storage device 104 can be replaced by another configurable storage device 108, and so on.

Figure 2:
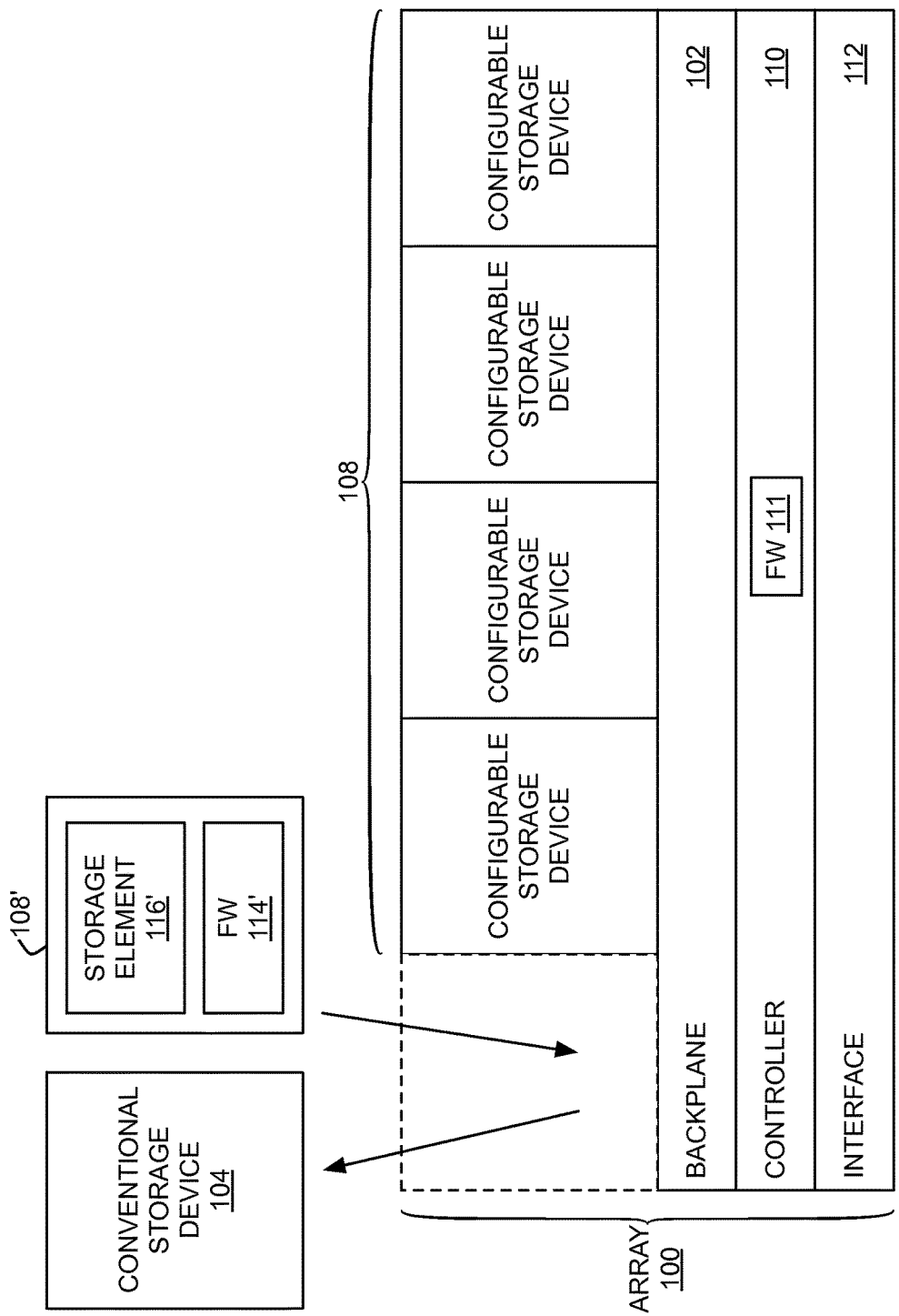
FIG. 2 is a diagram of an example storage device array in which the last conventional storage device is being replaced by a configurable storage device of a different type.

FIG. 2 shows an example of the array 100 when the last remaining conventional storage device 104 is being replaced by a configurable storage device 108, which is referenced in FIG. 2 as the configurable storage device 108' to distinguish it from the configurable storage devices 108 that have already become part of the array 100. The configurable storage device 108' thus includes firmware 114' and a storage element 116', which are no different than the firmware 114 and the storage element 116 described in relation to FIG. 1. The configurable storage device 108' is of the same (second) type as the configurable storage devices 108 that are already part of the array 100. As in FIG. 1, the array 100 includes a backplane 102, a controller 110 having firmware 111, and an interface 112 as has been described.

In operation, when the configurable storage device 108' is connected to the backplane 102, the firmware 114' transmits information, such as metadata, regarding its capability to the controller 110. As before, besides the intrinsic performance and capacity of the storage device 108', the firmware 114' transmits the fact that it is configurable to lesser performance and lesser capacity. The controller 110 receives this information.

The controller 110 determines (i.e., knows from prior communication) that the other storage devices 108 within the array 100 have been configured to have lesser performance and capacity than the configurable storage device 108' intrinsically does, even though the storage device 108' and the storage devices 108 are of the same (second) type. Therefore, the controller 110 transmits an instruction to the firmware 114' of the storage device 108' for the device 108' to be configured as the first type like the other configurable storage devices 108 are already configured. The firmware 114' receives this instruction, configures the storage device 108' appropriately, and the array 100 can then begin the rebuilding process due to the storage device 104 being replaced by the storage device 108'.

Once the array 100 has rebuilt, the controller 110 then sends an instruction to each configurable storage device 108 and 108' to reconfigure itself to have greater performance and/or capacity. The controller 110 determines (i.e., knows from prior communication) that the array 100 includes just storage devices 108 and 108' that are in fact of the second type and thus have greater performance and/or capacity than the first type in emulation of which they have been configured. Therefore, there is no longer any need for the configurable storage devices 108 and 108' to remain configured as the first type of storage device when the array 100 includes just storage devices of the second type.

It is noted that the storage device 108' is initially configured as the first type prior to being configured as the second type, to match the existing configurations of the other storage devices 108 already in the array 100, prior to all the storage devices 108' and 108 reconfiguring themselves to their intrinsic second type. This ensures that the array 100 has redundancy prior to such configuration to higher performance and/or higher capacity occurring. That is, when the storage device 108' is connected to the array 100, it is not immediately configured as the second type along with the storage devices 108 being reconfigured to the second type, but rather the storage device 108' is configured as the first type prior to the devices 108 and 108' all being reconfigured to the second type.

The example of FIG. 2 shows the adaptive nature of the array 100 according to the techniques disclosed herein. When the array 100 includes both non-configurable storage devices 104 and configurable storage devices 108, as in FIG. 1, then the storage devices 108 configure themselves to match the lower performance and/or capacity of the conventional storage devices 104. However, when the array 100 includes just configurable storage devices 108 (including 108'), as in FIG. 2, the storage devices 108 can ultimately configure themselves to their intrinsic higher performance and/or capacity.

Such adaptive performance enhancement can further be provided even when the array 100 includes one or more non-configurable storage devices 104. For instance, the non-configurable storage devices 104 may include all higher performance and/or capacity storage devices 104 and one lower performance and/or capacity storage device 104. If the lower performance and/or capacity storage device 104 is replaced by a configurable storage device 108, then the configurable storage device 108 can configure itself to match the performance and/or capacity of the higher performance and/or capacity storage devices 104 that remain in the array 100. As such, performance and/or capacity is improved. In general, the configurable storage devices 108 configure themselves to match the lowest capacity and the lowest performance of any non-configurable storage device 104 within the array 100, each time a configurable storage device 108 is added to the array 100.

FIG. 3 shows an example method 300, which is performed by the controller 110 of the storage device array 100. The method 300 subsumes both the examples of FIGS. 1 and 2 that have been described. A conventional storage device 104 is replaced by a configurable storage device 108 within the array 100 (302). In response, the configurable storage device 108 (specifically the firmware 114 thereof) sends information, such as metadata, regarding its capabilities to the controller 110, which receives this information (304).

The controller 110 is able to determine from this information that the storage device 108 is in fact configurable. In response to this determination, the controller 110 transmits an instruction to the configurable storage device 108 to emulate the conventional storage device 104's type (306). That is, the controller 110 instructs the configurable storage device 108 to configure itself as a device of the same (first) type as the conventional storage device 104 that has been removed. Such configuration can include matching the performance and capacity characteristics of the conventional storage device 104.

Note in actuality the controller 110 is instructing the configurable storage device 108 to configure itself to match the type of the other storage devices already in the array 100. Any of these other storage devices that are conventional storage devices 104 will be of the first type. Any of these other storage devices that are configurable storage devices 108 will have already been configured to be of this first type. This is because the method 300 is performed each time a storage device of the array 100 is replaced by a different storage device, particularly a configurable storage device 108.

As such, the configurable storage device 108 that received the instruction that the controller 110 transmitted in part 306 configures itself as the (first) type of the conventional storage device 104 that has been removed, and thus matching the type as which the other storage devices in the array 100 have been configured (308). The array 100 then is rebuilt to ensure redundancy. As noted above, most kinds of storage device arrays can withstand the loss or removal of one storage device without losing any data, but at the expense that redundancy is no longer provided. Once the array 100 is rebuilt, redundancy again is provided. However, other types of arrays, such as RAID-6, can permit the loss or removal of two (or potentially more) storage devices without compromising redundancy.

Once the array 100 has been rebuilt, the controller 110 determines whether performance and/or capacity of the array 100 can be adaptively increased. First, if the conventional storage device 104 replaced in part 302 had the lowest performance and/or capacity of any storage device 104 within the array 100, then the performance and/or capacity of the array 100 can be adaptively increased to the performance and/or capacity of the device 104 still in the array 100 that now has the lowest performance and/or capacity. Second, if the conventional storage device 104 replaced in part 302 was the last remaining such storage device 104 in the array 100, such that the array 100 now includes just configurable storage devices 108, then the array 100 can have its performance and/or capacity adaptively increased to the performance and/or capacity of these devices 108. If performance and/or capacity of the array 100 cannot be adaptively increased as a result of the storage device replacement that occurred in part 302 (310), then the method 300 is finished (312). This means that the array 100 remains configured as the first type, with lower performance and/or capacity than the second type that the configurable storage devices 108 can otherwise intrinsically provide.

However, if the performance and/or capacity of the array 100 can be adaptively increased as a result of the storage device replacement that occurred in part 302 (310), then the array 100 has its performance and/or capacity adaptively increased. The controller 110 transmits an instruction to each such storage device 108 within the array 100 to configure itself as a different type (314), such as the second type that the configurable storage devices 108 intrinsically are in the case where the array 100 includes just configurable storage devices 108. In the case where the array 100 still includes conventional storage devices 104, the instruction specifies the different type as the type of the conventional storage device 104 still in the array 100 that has the lowest performance and/or capacity. The configurable storage devices 108 therefore reconfigure themselves responsive to the instruction (316), and the array 100 then has better performance and/or capacity than before.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
  responsive to a storage device of a first type currently connected to a backplane of an array connected to a plurality of storage devices including the storage device of the first type having been replaced by a replacement storage device of a second type, each of the type and the second type includes a storage device performance, a storage device manufacturer, and a storage device model, performing:

determining, by a controller of the array connected to the backplane to communicate with the storage devices connected to the backplane, whether any other storage device currently connected to the backplane is of the first type; and in response to the controller determining that any other storage device currently connected to the backplane is of the first type, sending by the controller to the replacement storage device an instruction to configure itself as a storage device having the storage device performance, the storage device manufacturer, and the storage device model of the first type, wherein responsive to receiving the instruction from the controller, the replacement storage device configures itself as the storage device having the storage device performance, the storage device manufacturer, and the storage device model of the first type.

2. The method of claim 1, wherein after replacement of the existing storage device of the first type, at least one other storage device of the array is still a storage device of the first type.

3. The method of claim 1, wherein the storage device performance of the second type is greater than the storage device performance of the first type, the storage device capacity of the second type is greater than the storage device capacity of the first type.

4. The method of claim 1, wherein each other storage device of the array is of the first type, and the method further comprises:

in response to replacement of each other storage device of the first type with a replacement storage device of the second type in individual succession, except for a last storage device of the array, causing, by the controller, the replacement storage device to configure itself as a storage device of the first type;

in response to replacement of the last storage device of the first type with a replacement storage device of the second type, performing:

determining, by the controller, that all the storage devices of the array are now of the second type; and instructing, by the controller, each storage device of the array to configure itself as a storage device of the second type instead of as a storage device of the first type.

5. The method of claim 4, wherein the storage device performance of the second type is greater than the storage device performance of the first type, such that upon replacement of the last storage device of the first type with a replacement storage device of the second type, the array operates at a greater performance than before the last storage device was replaced.

6. The method of claim 5, wherein the storage device capacity of the second type is greater than the storage device capacity of the first type, such that upon replacement of the last storage device of the first type with a replacement storage device of the second type, the array has a greater capacity than before the last storage device was replaced.

\* \* \* \* \*